US009175368B2

(12) United States Patent
Liu et al.

(10) Patent No.: US 9,175,368 B2
(45) Date of Patent: *Nov. 3, 2015

(54) MN DOPED SN-BASE SOLDER ALLOY AND SOLDER JOINTS THEREOF WITH SUPERIOR DROP SHOCK RELIABILITY

(75) Inventors: Weiping Liu, New Hartford, NY (US); Ning-Cheng Lee, New Hartford, NY (US)

(73) Assignee: Indium Corporation, Clinton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,586

(22) Filed: Jul. 5, 2012

(65) Prior Publication Data

US 2012/0328361 A1    Dec. 27, 2012

Related U.S. Application Data

(63) Continuation-in-part of application No. 11/567,525, filed on Dec. 6, 2006.

(60) Provisional application No. 61/543,250, filed on Oct. 4, 2011, provisional application No. 60/749,615, filed on Dec. 13, 2005.

(51) Int. Cl.
| | |
|---|---|
| *B23K 35/26* | (2006.01) |
| *C22C 13/00* | (2006.01) |
| *C22C 13/02* | (2006.01) |
| *B23K 35/02* | (2006.01) |

(52) U.S. Cl.
CPC ............. *C22C 13/00* (2013.01); *B23K 35/0244* (2013.01); *B23K 35/262* (2013.01); *C22C 13/02* (2013.01); *Y10T 403/479* (2015.01)

(58) Field of Classification Search
USPC ................. 420/560, 561; 148/400, 22, 23, 24
IPC .................... C22C 13/00,13/02; B23K 35/0244, B23K 35/262; Y10T 403/479
See application file for complete search history.

(56) References Cited

U.S. PATENT DOCUMENTS

| | | | |
|---|---|---|---|
| 6,517,602 B2 * | 2/2003 | Sato et al. ........................ 75/255 |
| 2002/0192106 A1* | 12/2002 | Takaoka et al. ............... 420/560 |
| 2005/0100474 A1 | 5/2005 | Huang et al. |
| 2008/0271997 A1 | 11/2008 | Facey et al. |

FOREIGN PATENT DOCUMENTS

| | | |
|---|---|---|
| CN | 1398696 A | 2/2003 |
| CN | 1400081 | 3/2003 |

(Continued)

OTHER PUBLICATIONS

International Search Report and the Written Opinion for International App No. PCT/US2012/058347, mailed Feb. 5, 2013, Authorized Officer: Galatiota, Maruska.

(Continued)

*Primary Examiner* — Sikyin Ip
(74) *Attorney, Agent, or Firm* — Sheppard Mullin Richter & Hampton LLP

(57) ABSTRACT

A Sn—Ag—Cu-based lead-free solder alloy and solder joints thereof with superior drop shock reliability are disclosed. The solder contains between greater than 0 wt. % and less than or equal to about 1.5 wt. % Ag; between greater than or equal to about 0.7 wt. % and less than or equal to about 2.0 wt. % Cu; between greater than or equal to about 0.001 and less than or equal to about 0,2 wt. % Mn; and a remainder of Sn.

15 Claims, 14 Drawing Sheets

(56) References Cited

FOREIGN PATENT DOCUMENTS

| | | | |
|---|---|---|---|
| CN | 1621196 | A | 6/2005 |
| CN | 1887500 | | 1/2007 |
| CN | 101072886 | | 11/2007 |
| EP | 1245328 | | 2/2002 |
| JP | 11216591 | A * | 10/1999 |
| JP | 2002248596 | A * | 9/2002 |
| JP | 2005014076 | A * | 1/2005 |
| JP | 2005118800 | A * | 5/2005 |
| JP | 2008218318 | | 9/2008 |
| WO | 2007070548 | | 6/2007 |

OTHER PUBLICATIONS

Weiping Liu et al., The Effects of Additives to SnAgCu Alloys on Microstructure and Drop Impact Reliability of Solder Joints, JOM, vol. 59, No. 7, pp. 26-31, Jul. 1, 2007.

Weiping Liu et al., The Superior Drop Test Performance of SAC-TI Solders and Its Mechanism, Electronic Technology Symposium 2008 33rd IEEE/CPMT, Nov. 4, 2008, pp. 1-9, NJ. US.

State of Intellectual Property Office of PRC, Notification of Reexamination, App No. 200680046350.5, Issued Oct. 17, 2014.

State of Intellectual Property Office of PRC, First Office Action, App No. 201280048936.0, Issued Dec. 2, 2014.

* cited by examiner

| | Solder composition (wt. %) | | | Average number of drops to failure | STDEV[1] | Drop height (meters) |
|---|---|---|---|---|---|---|
| No.[2] | Sn | Ag | Cu | Mn, Ce, Bi, Ti, Y | | | |
| 1 | Bal. | 1.07 | 0.47 | 0.08 Mn | 8.4 | 2.37 | 0.5 |
| 2 | Bal. | 1.1 | 0.64 | 0.13 Mn | 35.4 | 19.25 | 0.5 |
| 3 | Bal. | 1.13 | 0.6 | 0.16 Mn | 23.5 | 6.4 | 0.5 |
| 4 | Bal. | 1.1 | 0.45 | 0.25 Mn | 5.6 | 2.63 | 0.5 |
| 5 | Bal. | 1.07 | 0.58 | 0.04 Ce | 20.9 | 6.51 | 0.5 |
| 6 | Bal. | 1.05 | 0.56 | 0.3 Bi | 14.6 | 5.54 | 0.5 |
| 7 | Bal. | 1.05 | 0.73 | 0.07 Ti | 10.6 | 7.47 | 0.5 |
| 8 | Bal. | 1.16 | 0.5 | 0.08 Y | 6.6 | 2.72 | 0.5 |
| 9 | Bal. | 1.0 | 0.46 | 0.3 Bi, 0.1 Mn | 11.9 | 6.51 | 0.5 |
| 10 | Bal. | 1.05 | 0.46 | 0.6 Bi, 0.07 Mn | 9.7 | 4.69 | 0.5 |
| 11 | Bal. | 1.19 | 0.49 | 0.4 Bi, 0.06 Y | 10.6 | 6.98 | 0.5 |
| 12 | Bal. | 1.15 | 0.46 | 0.8 Bi, 0.08 Y | 6.3 | 4.32 | 0.5 |
| 13 | Bal. | 1.05 | 0.64 | 0.2 Mn, 0.02 Ce | 28.5 | 16.56 | 0.5 |
| 14 | Bal. | 3.0 | 0.5 | | 1.2 | 0.42 | 0.5 |
| 15 | Bal. | 3.8 | 0.7 | | 1.1 | 0.32 | 0.5 |
| 16 | Bal. | 1.0 | 0.5 | | 5.1 | 1.85 | 0.5 |
| 17 | Bal. | | | 37 Pb[3] | 23.8 | 14.33 | 0.5 |
| 18 | Bal. | | 0.63 | 0.12 Mn | 23.0 | 13.99 | 0.5 |
| 19 | Bal. | 1.76 | 0.68 | 0.15 Mn | 12.1 | 9.65 | 0.5 |
| 20 | Bal. | 2.59 | 0.65 | 0.12 Mn | 6.0 | 2.31 | 0.5 |
| 21 | Bal. | 3.09 | 0.64 | 0.14 Mn | 2.4 | 0.7 | 0.5 |
| 22 | Bal. | 3.26 | 0.44 | 0.08 Y | 6.0 | 2.0 | 0.25 |
| 23 | Bal. | 3.23 | 0.42 | 0.3 Y | 6.0 | 1.5 | 0.25 |
| 24 | Bal. | 3.0 | 0.5 | | 2.75 | 1.7 | 0.25 |

(1) STDEV = standard deviation
(2) Nos. 1 to 13 and Nos. 18 to 23 are solder alloys formulated in accordance with embodiments of the present disclosure; and Nos. 14 to 17 and No. 24 are control solder alloys for comparison purposes.
(3) Eutectic Sn-Pb solder alloy.

FIG. 1

| Alloys | Solidus (°C) | Liquidus (°C) |
|---|---|---|
| Sn1.1Ag0.64Cu0.13Mn | 217.52 | 227.26 |
| Sn1.13Ag0.6Cu0.16Mn | 217.81 | 225.98 |
| Sn1.07Ag0.58Cu0.037Ce | 217.65 | 226.14 |
| Sn1.05Ag0.73Cu0.067Ti | 217.59 | 227.56 |
| Sn1.16Ag0.5Cu0.08Y | 217.43 | 226.56 |
| Sn1.05Ag0.56Cu0.3Bi | 216.98 | 226.03 |
| Sn1.0Ag0.46Cu0.3Bi0.1Mn | 216.22 | 226.98 |
| Sn1.19Ag0.49Cu0.4Bi0.06Y | 216.87 | 227.10 |
| Sn1.05Ag0.64Cu0.2Mn0.02Ce | 217.22 | 225.43 |
| Sn1.0Ag0.5Cu (SAC105) | 217.18 | 226.80 |
| Sn3.0Ag0.5Cu (SAC305) | 217.64 | 222.81 |
| Sn37Pb | 180.75 | 183.72 |

Figure 2

| No. | Solder composition (wt.%) | | | | Average number of drops to failure | STDEV[1] | Drop height (meter) |
|---|---|---|---|---|---|---|---|
| | Sn | Ag | Cu | Mn,Ce,Bi,Ti,Y | | | |
| 1 | Bal. | 1.07 | 0.47 | 0.085 Mn | 17.1 | 12.86 | 0.5 |
| 2 | Bal. | 1.1 | 0.64 | 0.13 Mn | 39.3 | 42.72 | 0.5 |
| 3 | Bal. | 1.13 | 0.6 | 0.16 Mn | 23.7 | 16.21 | 0.5 |
| 4 | Bal. | 1.1 | 0.45 | 0.25 Mn | 5.8 | 3.94 | 0.5 |
| 5 | Bal. | 1.07 | 0.58 | 0.04 Ce | 23.2 | 23.34 | 0.5 |
| 6 | Bal. | 1.05 | 0.56 | 0.3 Bi | 5.1 | 2.28 | 0.5 |
| 7 | Bal. | 1.05 | 0.73 | 0.07 Ti | 18.7 | 24.93 | 0.5 |
| 8 | Bal. | 1.16 | 0.5 | 0.08 Y | 3.7 | 4.45 | 0.5 |
| 9 | Bal. | 1.0 | 0.46 | 0.3 Bi, 0.1 Mn | 23.4 | 29.89 | 0.5 |
| 10 | Bal. | 1.05 | 0.46 | 0.6 Bi, 0.07 Mn | 11.1 | 9.1 | 0.5 |
| 11 | Bal. | 1.19 | 0.49 | 0.4 Bi, 0.06 Y | 17.5 | 19.56 | 0.5 |
| 12 | Bal. | 1.15 | 0.46 | 0.8 Bi, 0.08 Y | 11.7 | 6.34 | 0.5 |
| 13 | Bal. | 1.05 | 0.64 | 0.2 Mn, 0.02 Ce | 6.0 | 5.42 | 0.5 |
| 14 | Bal. | 3.0 | 0.5 | | 1.0 | 0.0 | 0.5 |
| 15 | Bal. | 3.8 | 0.7 | | 1.0 | 0.0 | 0.5 |
| 16 | Bal. | 1.0 | 0.5 | | 5.4 | 2.91 | 0.5 |
| 17 | Bal. | | | 37 Pb | 4.0 | 3.06 | 0.5 |

(1) STDEV=standard deviation.

Figure 3

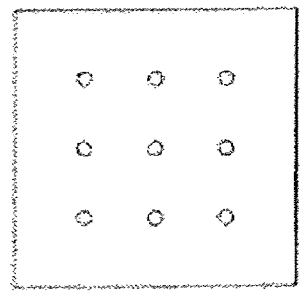 BGA coupon
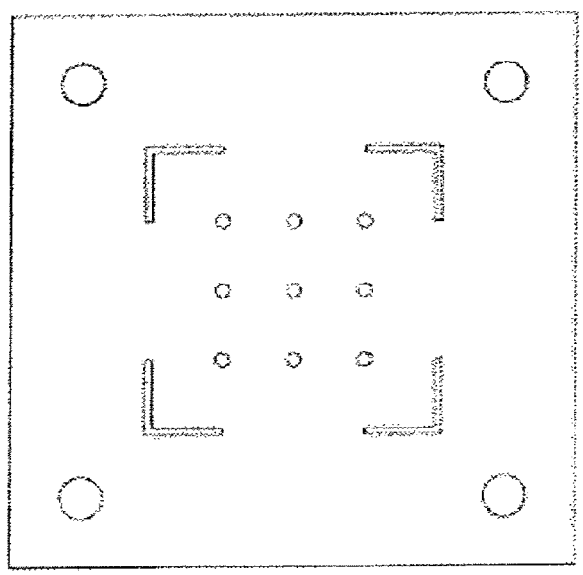 PCB substrate
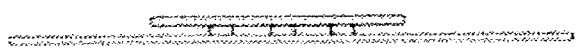 BGA assembly
Figure 4

| No. | Solder composition (wt.%) | | | | Average number of drops to failure | STDEV[1] | Drop height (meter) |
|---|---|---|---|---|---|---|---|
| | Sn | Ag | Cu | Mn | | | |
| 16 | Bal. | 1.0 | 0.5 | 0 | 4 | 0.8 | 1 |
| 25 | Bal. | 0.5 | 0.5 | 0 | 3.8 | 0.8 | 1 |
| 26 | Bal. | 0.5 | 1 | 0 | 34.8 | 12.4 | 1 |
| 27 | Bal. | 0.5 | 1 | 0.05 | 52.5 | 12.7 | 1 |

(1) STDEV=standard deviation

Figure 8

| No. | Solder composition (wt.%) | | | | Average number of drops to failure | STDEV[1] | Drop height (meter) |
|---|---|---|---|---|---|---|---|
| | Sn | Ag | Cu | Mn | | | |
| C1 | Bal. | 1.08 | 0.50 | 0 | 4 | 0.8 | 1 |
| C2 | Bal. | 0.58 | 0.49 | 0 | 3.8 | 0.8 | 1 |
| C3 | Bal. | 0.54 | 0.96 | 0 | 34.8 | 12.4 | 1 |
| 27a | Bal. | 0.5 | 0.91 | 0.04 | 52.5 | 12.7 | 1 |
| 27a[2] | Bal. | 0.5 | 0.91 | 0.04 | 58.2 | 12.9 | 1 |
| 27b | Bal. | 0.56 | 1.05 | 0.06 | 62.2 | 3.8 | 1 |

(1) STDEV=standard deviation
(2) Repeat test of No. 27a alloy

Figure 9

| | Solder composition (wt.%) | | | | Average number of drops to failure | STDEV[1] | Drop height (meter) |
|---|---|---|---|---|---|---|---|
| No. | Sn | Ag | Cu | Mn | | | |
| C1 | Bal. | 1.08 | 0.50 | 0 | 15.3 | 5.5 | 1 |
| 27a | Bal. | 0.5 | 0.91 | 0.04 | 94.3 | 11.7 | 1 |
| 27b | Bal. | 0.56 | 1.05 | 0.06 | 103.3 | 14.0 | 1 |
| 27c | Bal. | 0.47 | 0.99 | 0.03 | 144.7 | 27.1 | 1 |

(1) STDEV=standard deviation

Figure 10

| No. | Solder composition (wt.%) | | | | Solidus (°C) | Liquidus (°C) |
| --- | --- | --- | --- | --- | --- | --- |
| | Sn | Ag | Cu | Mn | | |
| 27a | Bal. | 0.5 | 0.91 | 0.04 | 217.84 | 226.76 |
| 27b | Bal. | 0.56 | 1.05 | 0.06 | 217.71 | 226.59 |
| 27c | Bal. | 0.47 | 0.99 | 0.03 | 217.86 | 226.56 |
| 27d | Bal. | 0.51 | 1.10 | 0.08 | 217.84 | 226.93 |
| 27e | Bal. | 0.50 | 1.10 | 0.06 | 217.77 | 226.49 |
| 27f | Bal. | 0.51 | 0.80 | 0.05 | 217.87 | 226.22 |

Figure 11

MN DOPED SN-BASE SOLDER ALLOY AND SOLDER JOINTS THEREOF WITH SUPERIOR DROP SHOCK RELIABILITY

CROSS-REFERENCE TO RELATED APPLICATIONS

This application claims the benefit of the priority of Provisional U.S. Application Nos. 61/543,250, filed on Oct. 4, 2011, and is also a continuation-in-part of and claims the benefit of the priority of U.S. application Ser. No. 11/567,525, filed Dec. 6, 2006, which claimed the benefit of Provisional U.S. Application Ser. No. 60/749,615, filed Dec. 13, 2005, each of which is hereby incorporated herein by reference in the respective entirety of each.

TECHNICAL FIELD

The present disclosure relates generally to lead-free solder alloy compositions for use in electronics and, in particular, to lead-free solder balls, solder powder, solder pastes, and solder joints made of the lead-free solder alloy.

DESCRIPTION OF THE RELATED ART

Among the various lead-free solder alloy choices as replacements of conventional tin-lead solders, Tin (Sn)-Silver (Ag)-Copper (Cu) alloys are currently the most popular because of their relatively good soldering performance, excellent creep resistance, and thermal fatigue reliability, as well as their compatibility with the current components. A variety of Sn—Ag—Cu solder alloys have been proposed and recommended for use by industrial organizations in different countries. For example, Sn-3.0Ag-0.5Cu (wt. %) by the Japan Electronic Industry Development Association (JEIDA) in Japan, Sn-3.8Ag-0.7Cu (wt. %) by the European Consortium BRITE-EURAM in the European Union, and Sn-3.9Ag-0.6Cu (wt. %) by the National Electronics Manufacturing Initiative (NEMI) in the United States of America. However, recent investigations on the lead-free solder alloys have shown that solder joints made from these recommended Sn—Ag—Cu alloys may be fragile and prone to premature interfacial failure under drop impact loading. Although reduction of Ag content in Sn—Ag—Cu alloys has been found to be helpful, drop test performance for these alloys is still inferior to that of eutectic tin-lead. Traditionally, solder joint reliability has been evaluated mainly by thermal fatigue performance since thermal fatigue fracture has been the critical failure mode in electronics interconnects. As the industry is pushing for device miniaturization and increased use of portable electronic products, impact reliability of solder joints in electronic packages becomes critical, in addition to conventional thermal fatigue reliability.

The drop impact reliability of solder joints in electronic packages is critical to the lifetime of portable electronic products using ball grid array (BGA) and/or chip scale packages (CSP), which are getting more and more popular due to the device miniaturization trend in the electronics industry. The drop test performance of BGA and CSP solder joints made with SnAgCu (SAC) solder spheres is poorer than that with their SnPb counterparts. Recent investigations found that the reduction of Ag content in SnAgCu alloys can be helpful in improving the BGA/CSP drop impact reliability. Thus, SAC105 (Sn-1.0Ag-0.5Cu, wt. %) alloy is replacing the SAC405 (Sn-4.0Ag-0.5Cu, wt. %) and SAC305 (Sn-3.0Ag-0.5Cu, wt. %) alloys as the industry standard alloy in most of the BGA/CSP ball alloy applications. In particular, SAC105 is virtually the standard solder in mobile applications, such as cellphones. Currently, SAC105 is used in more than ¾ of all cell phones. However, the drop shock resistance of SAC105 is still not good enough to meet the industry's increasing challenges in the trend of miniaturization and cost reduction through elimination of BGA/CSP underfilling.

BRIEF SUMMARY OF EMBODIMENTS OF THE INVENTION

Lead-free solder alloys and solder joints thereof with improved drop impact resistance are disclosed. In one particular exemplary embodiment, the lead-free solder alloys preferably comprise 0.0-4.0 wt. % of Ag, 0.01-1.5 wt. % of Cu, at least one of the following additives: Mn in an amount of 0.001-1.0 wt. %, Ce in an amount of 0.001-0.8 wt. %, Y in an amount of 0.001-1.0 wt. %, Ti in an amount of 0.001-0.8 wt. %, and Bi in an amount of 0.01-1.0 wt. %, and the remainder of Sn.

In accordance with other aspects of this particular exemplary embodiment, the preferred content of Ag is 0.0-2.6 wt. %.

In accordance with further aspects of this particular exemplary embodiment, the preferred content of Mn is 0.01-0.3 wt. %.

In accordance with additional aspects of this particular exemplary embodiment, the preferred content of Ce is 0.01-0.2 wt. %.

In accordance with still other aspects of this particular exemplary embodiment, the preferred content of Ti is 0.01-0.2 wt. %.

In accordance with still further aspects of this particular exemplary embodiment, the preferred content of Y is 0.01-0.4 wt. %.

In accordance with still additional aspects of this particular exemplary embodiment, the preferred content of Bi is 0.01-0.5 wt. %.

In accordance with yet still additional aspects of this particular exemplary embodiment, the lead-free solder alloy may electronically join substrate surface finishes formed using one or more of: electroplated Ni/Au, electroless Ni immersion Au (ENIG), organic solderability preservatives (OSP), immersion Ag, and immersion Sn.

In another particular exemplary embodiment, a solder ball may be formed of a lead-free solder alloy preferably comprising 0.0-4.0 wt. % of Ag, 0.01-1.5 wt. % of Cu, at least one of the following additives: Mn in an amount of 0.001-1.0 wt. %, Ce in an amount of 0.001-0.8 wt. %, Y in an amount of 0.001-1.0 wt. %, Ti in an amount of 0.001-0.8 wt. %, and Bi in an amount of 0.01-1.0 wt. %, and the remainder of Sn.

In still another particular exemplary embodiment, a solder powder may be formed of a lead-free solder alloy preferably comprising 0.0-4.0 wt. % of Ag, 0.01-1.5 wt. % of Cu, at least one of the following additives: Mn in an amount of 0.001-1.0 wt. %, Ce in an amount of 0.001-0.8 wt. %, Y in an amount of 0.001-1.0 wt. %, Ti in an amount of 0.001-0.8 wt. %, and Bi in an amount of 0.01-1.0 wt. %, and the remainder of Sn.

In yet another particular exemplary embodiment, a solder paste may comprise a solder powder formed of a lead-free solder alloy preferably comprising 0.0-4.0 wt. % of Ag, 0.01-1.5 wt. % of Cu, at least one of the following additives: Mn in an amount of 0.001-1.0 wt. %, Ce in an amount of 0.001-0.8 wt. %, Y in an amount of 0.001-1.0 wt. %, Ti in an amount of 0.001-0.8 wt. %, and Bi in an amount of 0.01-1.0 wt. %, and the remainder of Sn.

In still another particular exemplary embodiment, a ball grid array (BGA) for arranging electronic components on printed circuit boards may comprise solder balls formed of a lead-free solder alloy preferably comprising 0.0-4.0 wt. % of Ag, 0.01-1.5 wt. % of Cu, at least one of the following additives: Mn in an amount of 0.001-1.0 wt. %, Ce in an amount of 0.001-0.8 wt. %, Y in an amount of 0.001-1.0 wt. %, Ti in an amount of 0.001-0.8 wt. %, and Bi in an amount of 0.01-1.0 wt. %, and the remainder of Sn.

In yet another particular exemplary embodiment, a solder joint within an electronic device may be formed of a lead-free solder alloy preferably comprising 0.0-4.0 wt. % of Ag, 0.01-1.5 wt. % of Cu, at least one of the following additives: Mn in an amount of 0.001-1.0 wt. %, Ce in an amount of 0.001-0.8 wt. %, Y in an amount of 0.001-1.0 wt. %, Ti in an amount of 0.001-0.8 wt. %, and Bi in an amount of 0.01-1.0 wt. %, and the remainder of Sn.

In a further embodiment, the solder alloy comprises an amount of Ag greater than 0 wt. % and less than or equal to about 1.5 wt. %, 0.7-2.0 wt. % of Cu, 0.001-0.2 wt. % of Mn, and the remainder of Sn.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 1 is a table showing comparative drop impact resistance data for as-reflowed solder joints formed of example solder alloys formulated in accordance with embodiments of the present disclosure and control solder alloys.

FIG. 2 is a table showing comparative melting behavior of example solder alloys formulated in accordance with embodiments of the present disclosure and control solder alloys.

FIG. 3 is a table showing comparative drop impact resistance data for as-reflowed solder joints formed of example solder alloys formulated in accordance with embodiments of the present disclosure and control solder alloys after thermal aging at 150° C. for four weeks.

FIG. 4 shows a BGA test coupon, a PCB substrate, and a resulting simulated BGA assembly formed therefrom for testing solder joints formed of example solder alloys formulated in accordance with embodiments of the present disclosure.

FIG. 8 is a table comparing the drop shock resistance of BGA solder joints made of different alloys.

FIG. 9 is a table comparing the drop shock resistance of BGA solder joints of different alloys.

FIG. 10 is a table comparing the drop shock resistance of BGA solder joints of different alloys.

FIG. 11 is a table presenting additional alloy compositions and their liquidus and solidus temperatures.

Figure 5:
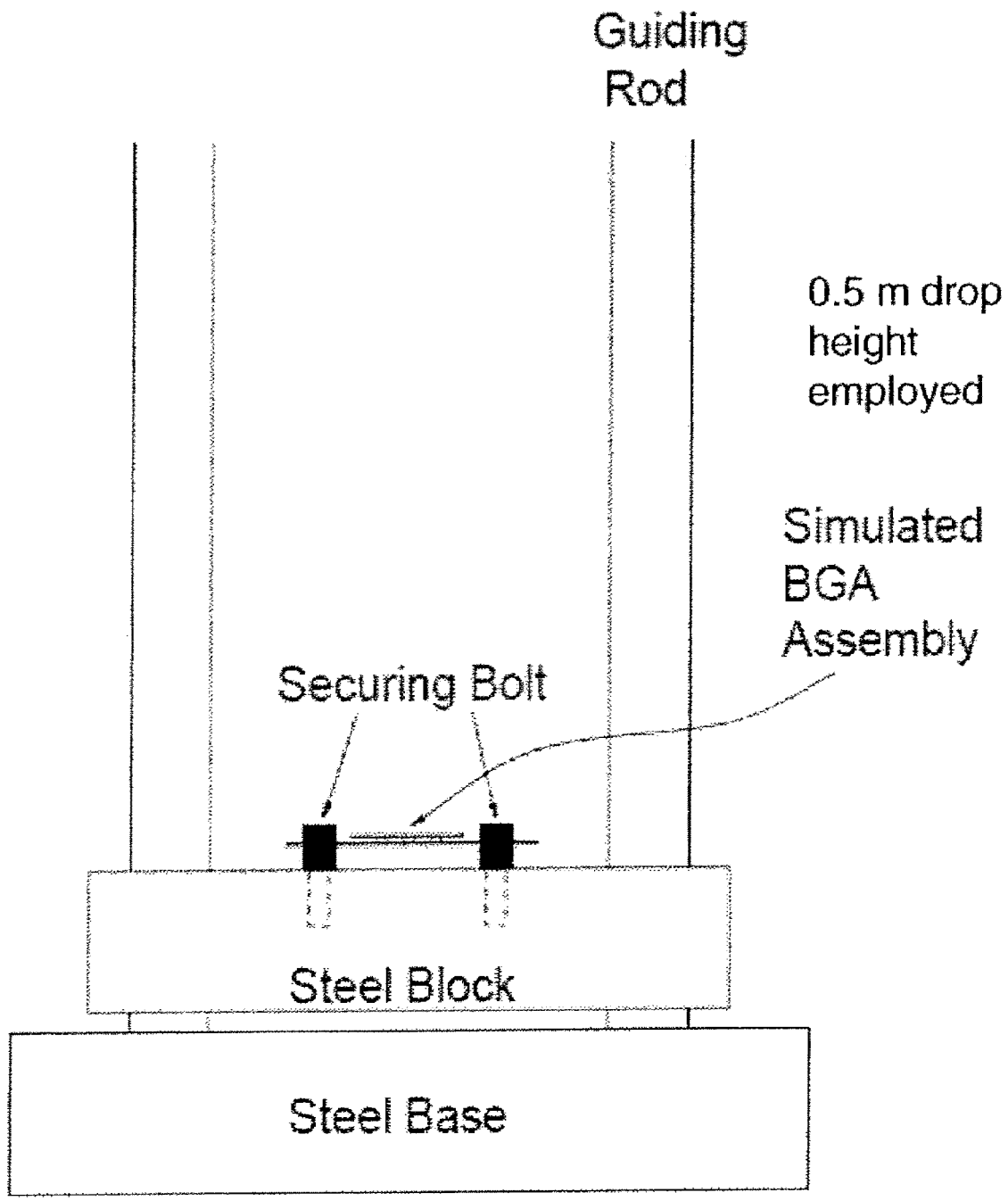
FIG. 5 shows a drop impact resistance tester for testing solder joints formed of example solder alloys formulated in accordance with embodiments of the present disclosure.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for providing a management system for materials handling. In one embodiment The present disclosure relates to Sn—Ag—Cu based (i.e., lead-free) solder alloys and solder joints thereof with improved drop impact reliability. The disclosed Sn—Ag—Cu based solder alloys preferably comprise 0.0-4.0 wt. % of Ag, 0.01-1.5 wt. % of Cu, at least one of the following additives: Mn in an amount of 0.001-1.0 wt. %, Ce in an amount of 0.001-0.8 wt. %, Y in an amount of 0.001-1.0 wt. %, Ti in an amount of 0.001-0.8 wt. %, and Bi in an amount of 0.01-1.0 wt. %, and the remainder of Sn.

Solder joints made of the above-described lead-free solder alloys have a higher drop impact resistance, compared to those made of the conventional Sn—Ag—Cu solder alloys that have been recommended and are currently in use in the industry.

The disclosed Sn—Ag—Cu based solder alloys are particularly suitable for, but not limited to, producing solder bumps such as those in ball grid array (BGA) packages which require high drop impact reliability especially when used in mobile and portable electronic products.

Referring to FIG. 1, there is shown a table showing comparative drop impact resistance data for as-reflowed solder joints formed of example solder alloys formulated in accordance with embodiments of the present disclosure and control solder alloys. The example solder alloys formulated in accordance with embodiments of the present disclosure include Sn—Ag—Cu based solder alloys comprising 0.0-4.0 wt. % of Ag, 0.01-1.5 wt. % of Cu, at least one of the following additives: Mn in an amount of 0.001-1.0 wt. %, Ce in an amount of 0.001-0.8 wt. %, Y in an amount of 0.001-1.0 wt. %, Ti in an amount of 0.001-0.8 wt. %, and Bi in an amount of 0.01-1.0 wt. %, and the remainder of Sn. The control solder alloys include Sn-3.0Ag-0.5Cu, Sn-3.8Ag-0.7Cu, Sn-1.0Ag-0.5Cu, and 63Sn37Pb solders. As shown in the table of FIG. 1, the example solder alloys formulated in accordance with embodiments of the present disclosure exhibit superior drop impact resistance performance.

Referring to FIG. 2, there is shown a table showing comparative melting behavior of example solder alloys formulated in accordance with embodiments of the present disclosure and control solder alloys. The example solder alloys formulated in accordance with embodiments of the present disclosure include Sn—Ag—Cu based solder alloys comprising 0.0-4.0 wt. % of Ag, 0.01-1.5 wt. % of Cu, at least one of the following additives: Mn in an amount of 0.001-1.0 wt. %, Ce in an amount of 0.001-0.8 wt. %, Y in an amount of 0.001-1.0 wt. %, Ti in an amount of 0.001-0.8 wt. %, and Bi in an amount of 0.01-1.0 wt. %, and the remainder of Sn. The control solder alloys include Sn-3.0Ag-0.5Cu, Sn-3.8Ag-0.7Cu, Sn-1.0Ag-0.5Cu, and 63Sn37Pb solders. The melting temperature ranges of the solder alloys were measured with Differential Scanning calorimetry (DSC). The mass of sample for DSC was around 5-15 mg, and the scanning rate was 10° C./min. For each solder alloy, the sample was scanned twice. The sample was first scanned from ambient temperature up to 350° C., followed by cooling down to ambient temperature naturally, then scanned again up to 350° C. The second scanning thermograph was used to represent the melting behavior of alloys. As shown in the table of FIG. 2, the addition of a small amount of additives in accordance with the present disclosure has a negligible effect on the melting behavior of the corresponding Sn—Ag—Cu solder alloys. Thus, the use of solder alloys in accordance with the present disclosure is consistent with the condition for use of conventional Sn—Ag—Cu solder alloys.

The drop impact resistance of solder joints was evaluated using a drop tester such as shown in FIG. 5. Drop tests were conducted using a simulated BGA assembly such as shown in FIG. 4. The simulated BGA assembly comprised a BGA coupon and a printed circuit board (PCB) substrate. The BGA coupon, such as shown in FIG. 4, comprised a 40 mm×40 mm substrate, with a 3×3 array of distributed electroplated Nickel/Gold (Ni/Au) pads (2 mm diameter). The PCB substrate, such as shown in FIG. 4, was a 80 mm×80 mm substrate, with a corresponding 3×3 array of distributed electroplated Nickel/Gold (Ni/Au) pads (2 mm diameter) and 4 drilled holes (6 mm diameter) at the corners of the substrate for mounting the resulting simulated BGA assembly onto a steel drop block with four securing bolts (see FIG. 5).

Solder joints were formed between the corresponding pads in the 3×3 arrays of distributed electroplated Nickel/Gold (Ni/Au) pads on the BGA coupon and the PCB substrate. Each solder joint in the simulated BGA assembly was made of approximately 50 mg of solder alloy. To produce the simulated BGA assembly, solder spheres of a given alloy were first mounted onto the PCB substrate with the use of a no-clean flux, and reflowed using a reflow profile with a peak temperature 240° C. This bumped PCB substrate was then mounted to the BGA coupon, which was preprinted with the same no-clean flux on its pads and reflowed with the same profile.

The simulated BGA assembly was mounted onto the steel drop block with the four securing bolts (see FIG. 5). The clearance between the PCB substrate and the steel drop block was 5 mm. A strong drop impact was produced and imparted to the simulated BGA assembly by raising the steel drop block along two guiding rods to a certain height and then releasing the drop block and allowing it to drop freely along the guiding rods until hitting a steel base (see FIG. 5). The drop impact caused the PCB substrate in the simulated BGA assembly to vibrate on the four securing bolts, and the vibration in turn produced a drop impact in the solder joints in the simulated BGA assembly. The height used for drop tests was mostly 0.5 meters, but a reduced height of 0.25 meters was also used in some cases for solder alloys with a higher Ag content. Drop tests were conducted on the simulated BGA assembly both at the as-reflowed condition and after thermal aging at 150° C. for four weeks. For each test condition, 10 simulated BGA assemblies were used. The number of drops to failure (i.e., separation of the assembly) was used as the basis for comparison of the drop impact resistance of the solder joints. The higher the number of drops to failure, the greater the resistance to drop impact of the solder joint. Also, the greater the drop height used in testing, the higher the intensity of drop impact produced during testing.

The drop test results for the solder alloys formulated in accordance with embodiments of the present disclosure and the control solder alloys for the as-reflowed condition are shown in the table of FIG. 1. The conventional Sn-3.8Ag-0.7Cu (SAC387) and Sn-3.0Ag-0.5Cu (SAC305) alloys survived on average only 1.1 and 1,2 drops before failure, respectively. The conventional Sn-1.0Ag-0.5Cu (SAC105) alloy exhibited a mean drop number of 5.1, and thus was considerably better than SAC387 and SAC305. As shown in the table of FIG. 1, the solder alloys No. 1 to No. 13 that were formulated in accordance with embodiments of the present disclosure all exhibited a superior drop test performance than SAC105. The content of dopants in the solder alloys formulated in accordance with embodiments of the present disclosure also significantly influenced the drop test performances. For example, in the case of a Manganese (Mn) dopant (e.g., example solder alloys No. 1 to No. 4), the drop test performance improved with increasing Mn content, reaching a maximum mean value of 35.4 at 0.13 wt. % Mn content, and then decreasing with a further increase in Mn content.

Figure 6:
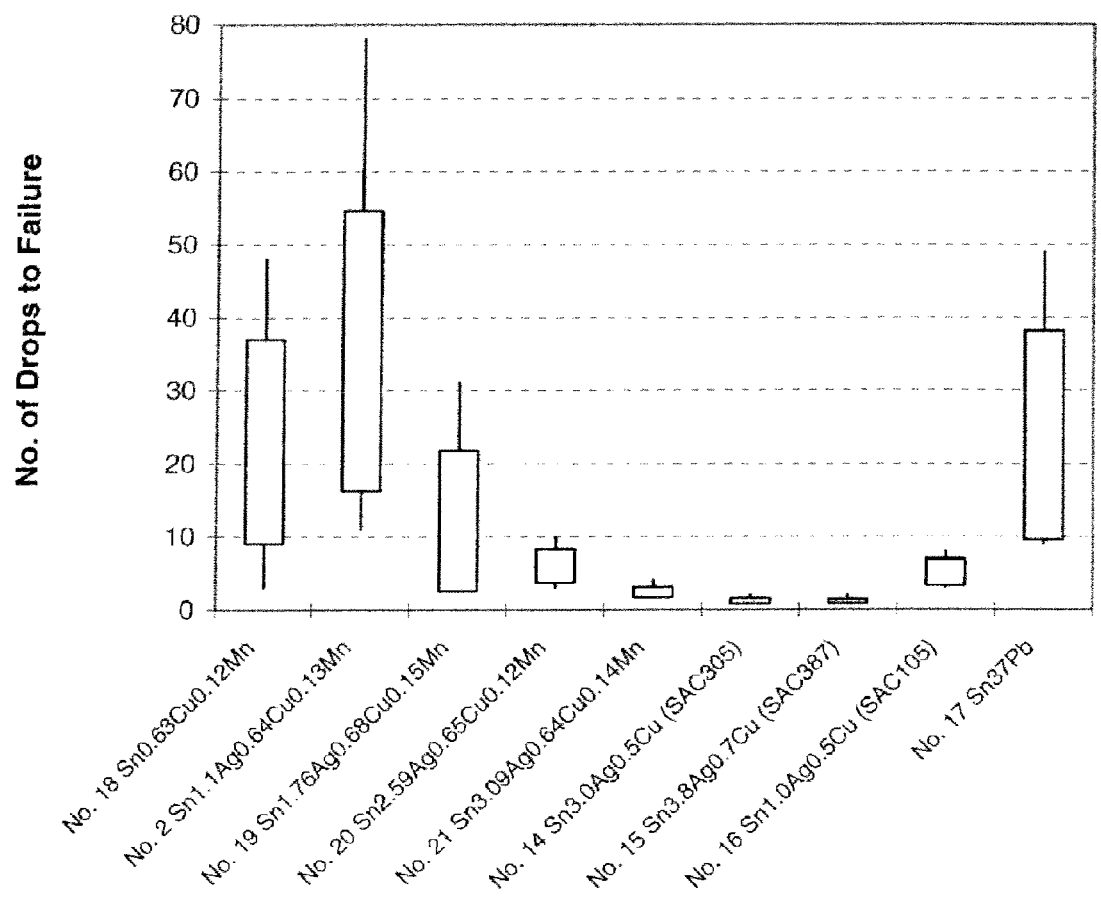
FIG. 6 is a chart showing the comparative effect of the Ag content on drop impact performance for as-reflowed solder joints of Sn—Ag—Cu—Mn solder alloys formulated in accordance with embodiments of the present disclosure and control solder alloys.

Referring to FIG. 6, there is shown is a chart showing the comparative effect of the Ag content on drop impact performance for as-reflowed solder joints of Sn—Ag—Cu—Mn solder alloys formulated in accordance with embodiments of the present disclosure and control solder alloys. Thus, FIG. 6 shows the effect of an Mn dopant on drop test performance of solder joints with various Ag content levels for the as-reflowed condition. In the chart of FIG. 6, the lower end of each vertical line denotes a minimum drop number, and the upper end of each vertical line denotes a maximum drop number, while each box represents two times the standard deviation, with the mean drop number being at the center of the box for each of the solder alloys. At an Mn dopant content of about 0.13 wt. %, the mean drop number was 23.0, 35.4, 12.1, 6.0, and 2.4 for solder alloys with an Ag content level of 0.0, 1.1, 1.76, 2.59, and 3.09 wt. %, respectively. Except for the solder alloy with 3.09 wt. % Ag, all other solder alloys with a lower Ag content level exhibited a mean value greater than that of SAC105 (mean value 5.1), not to mention SAC305 (mean value 1.2) and SAC387 (mean value 1.1). The drop test performance of example solder alloy No. 2, with a composition of Sn1.1Ag0.64Cu0.13Mn, was even better than the 63Sn37Pb solder alloy. Although a lower Ag content generally results in a better drop test performance for a Sn—Ag—Cu (SAC) solder alloy, the use of an Mn dopant essentially elevates the drop test performance of a 2.6 wt. % Ag alloy to that of SAC105.

Referring to FIG. 3, there is shown a table showing comparative drop impact resistance data for as-reflowed solder joints formed of example solder alloys formulated in accordance with embodiments of the present disclosure and control solder alloys after thermal aging at 150° C. for four weeks.

Figure 7:
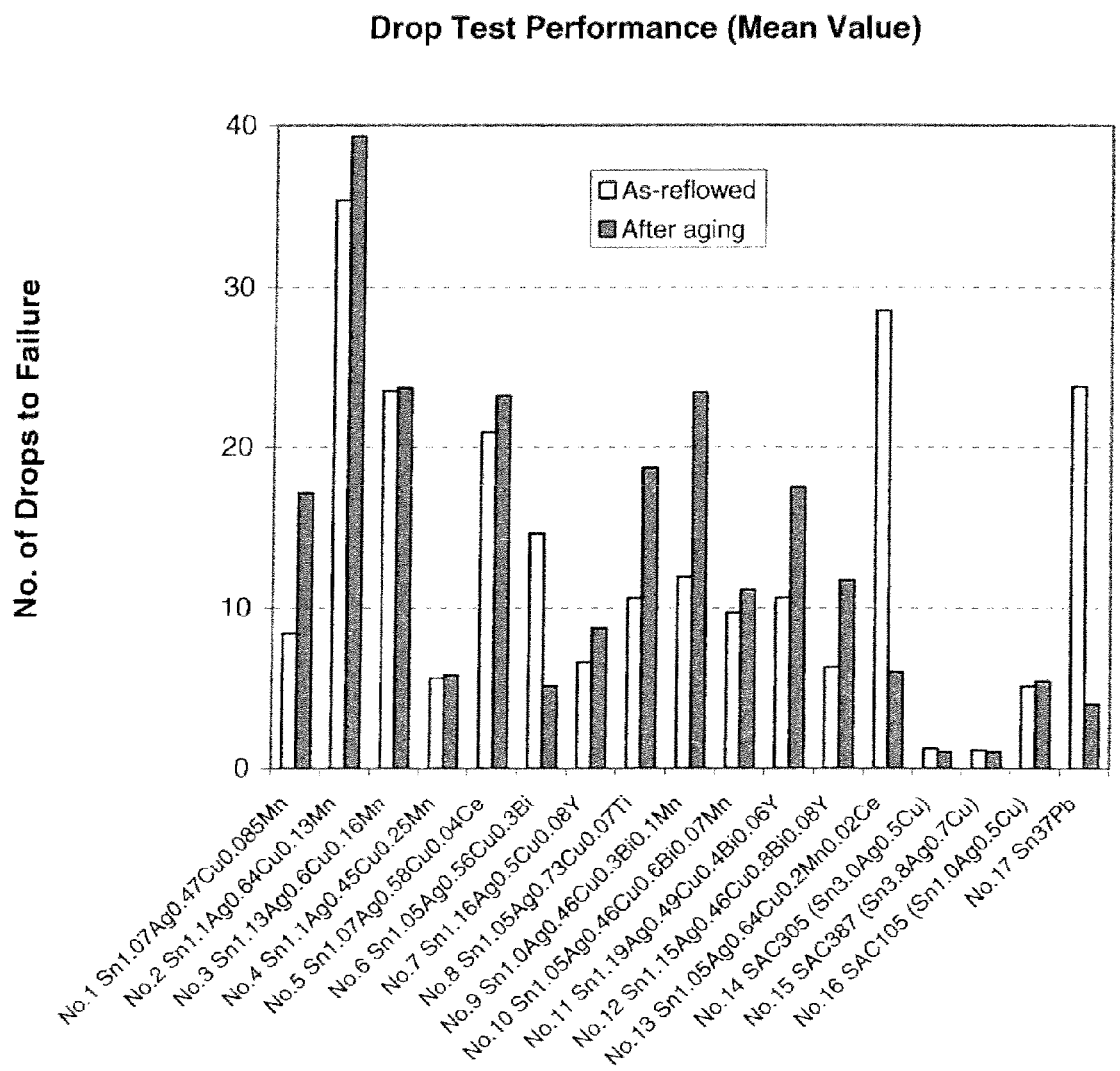
FIG. 7 is a chart showing comparative mean drop impact performance for as-reflowed and aged solder joints formed of example solder alloys formulated in accordance with embodiments of the present disclosure and control solder alloys.

Comparing the data at the as-reflowed condition as shown in FIG. 1 versus the thermally aged condition as shown in FIG. 3, it is revealed that while the mean drop number for the 63Sn37Pb eutectic alloy deteriorates significantly from 28.5 down to 4.0 after thermal aging, the solder alloys formulated in accordance with embodiments of the present disclosure generally exhibit a higher mean drop number after thermal aging except for the solder alloys No. 6 and No. 13 (see FIG. 7). The improvement of drop impact resistance with thermal aging is a good indication of reliability of solder joints made of the solder alloys formulated in accordance with embodiments of the present disclosure.

Based on the data presented above, the solder alloys formulated in accordance with embodiments of the present disclosure exhibited excellent drop impact resistance, and was superior to that of conventional SnAgCu solders (such as SAC305 and SAC105). Indeed, some of the solder alloys formulated in accordance with embodiments of the present disclosure had drop impact resistance performance even better than that of the SnPb eutectic alloy. The solder bumps or joints made from the solder alloys formulated in accordance with embodiments of the present disclosure have superior properties to those of conventional solder alloys. For instance, when a solder alloy formulated in accordance with embodiments of the present disclosure is used as a solder ball and/or solder powder in a solder paste to connect a BGA or CSP package to a PCB, the solder joint thus formed may not be readily damaged by detaching either from the PCB or from the package when the assembly is subject to a drop impact load during shipping, handling, or in use. As a result, the reliability of electronic equipment may be greatly improved due to the use of solder alloys formulated in accordance with embodiments of the present disclosure.

Further, a Sn—Ag—Cu-based lead-free solder alloy and solder joints thereof with superior drop shock reliability are disclosed.

The further solder alloy consists essentially of an amount of Ag greater than 0 wt. % and less than or equal to about 1.5 wt. %, 0.7-2.0 wt. % of Cu, 0.001-0.2 wt. % of Mn, and the remainder of Sn. The preferred alloy composition comprises about 0.5 wt. % of Ag, about 1.0 wt. % of Cu, about 0.05 wt. % of Mn, and the remainder of Sn.

The solder joints made of the above-described lead-free solder alloys have a greater drop shock resistance, compared to those made of the SAC105 (Sn-1.0Ag-0.5Cu, wt. %) alloy that is recognized currently as the most shock-resistant SnAgCu alloy and widely used in the industry.

The disclosed solder alloy is particularly suitable for, but not limited to, producing solder joints, in the form of a solder ball, solder powder, or solder paste (a mixture of solder powder and flux), such as those in BGA/CSP assemblies which require high drop shock reliability especially when used in mobile and portable electronic products.

The drop shock resistance of solder joints was evaluated using a drop tester. The drop test was conducted by a procedure described below. To produce a BGA component, the solder spheres, with a diameter of 0.254 mm, of a given alloy were first mounted onto Land Grid Array (LGA) substrate with the use of a water-soluble flux and then reflowed using a reflow profile with a peak temperature 235-240° C. After cleaning the flux residues with water wash and nitrogen baking at 100° C. for 1 hour, this bumped BGA package was then mounted onto a PCB test board preprinted with the type 4 SAC305 solder paste on pads and reflowed using a reflow profile with a peak temperature 235-240° C. The completed BGA assembly was mounted and secured onto the steel drop block by bolts in the drop tester. A strong shock was produced and imparted to the BGA assembly by raising the drop block along the two guiding rods to a certain height (1 meter under the present testing conditions) and then releasing the drop block and allowing it to drop freely along the guiding rods until it hits the steel base. The number of drops to failure, i.e., the complete separation of the BGA package from the PCB, was used for comparison of the drop shock resistance of the solder joint. The higher the number of drops, the greater the drop shock resistance of the solder joint.

The test results for the example of solder alloys according to the present disclosure and the industry standard SAC105 solder alloy are shown in FIG. 8. As these results indicate, the decrease in Ag from 1.0% to 0.5% between solders no. 16 and 25 did not significantly impact the drop test performance. The increase in Cu content from 0.5% to 1% between solders no. 25 and 26 resulted in a more than 8× improvement in average number of drops to failure.

The addition of 0.05% Mn between solders no. 25 and 27 resulted in more than a 50% improvement over solder 26 and more than a 13× improvement over the industry standard SAC 105 (solder no. 16). The drop test results listed for solder no. 27 are the results for a solder having a nominal composition of Sn0.5Ag1.0Cu0.05Mn, the measured composition that provided the results was Sn0.5Ag0.91Cu0.04Mn (alloy no. 27a of FIG. 9). Likewise, the measured composition for control alloy no. 16 is listed as alloy C1 in FIG. 9; the measured composition for control alloy no. 25 is listed as alloy C2; and the measured composition for control alloy no. 26 is listed as alloy C3. Additionally, alloy 27a was tested again under the same conditions described with respect to FIG. 8. As illustrated in FIG. 9, the second test showed an average of 58.2 drops to failure, which is very similar to the first test. A second specific alloy composition with the nominal composition of Sn0.5Ag1.00u0.05Mn, with the measured composition of Sn0.56Ag1.05Cu0.06Mn, was tested under these conditions (alloy no. 27b). Alloy 27b had similar drop test results, having an average of 62.2 drops to failure.

FIG. 10 illustrates further test results on alloys having the nominal composition of Sn0.5Ag1.00u0.05Mn. Each alloy in the table of FIG. 10 were tested under similar conditions as described above with respect to FIG. 8. However, in the tests of FIG. 10, the PCB test board was not preprinted with the type 4 SAC305 solder paste on the pads. Instead, the PCB test board was only printed with flux. The measured alloys 27a-c showed between a 6× and 9.5× improvement over the conventional SAC105 alloy C1.

The table illustrated in FIG. 11 provides other alloy compositions that were manufactured around the composition of Sn0.5Ag1.0Cu0.05Mn. In these compositions, the Ag ranged from 0.47 wt. % to 0.56 wt. %, the Cu ranged from 0.80 wt. % to 1.1 wt. %, and the Mn ranged from 0.03 wt. % to 0.08 wt. %. The solidus and liquidus temperatures for these alloys are also provided, illustrating that the solders have melting temperatures similar to conventional SAC alloys and suitable for lead-free electronics applications.

Figure 12:
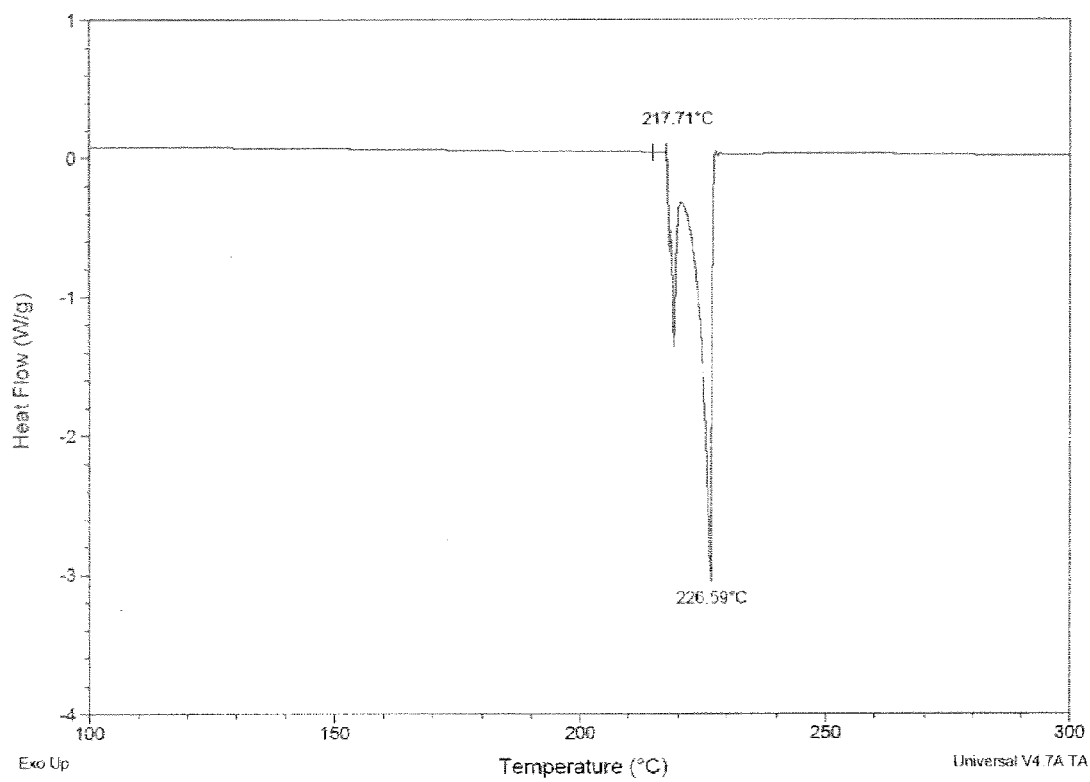
FIG. 12 is a DSC thermograph of an alloy composition.

FIG. 12 is an example differential scanning calorimetric (DSC) thermograph of alloy 27b. The DSC thermograph shows the alloy's melting temperature range to be from a solidus of 217.71° C. to a liquidus of 226.59° C. This range is similar to SAC105 and illustrates that the nominal solder Sn0.5Ag1.0Cu0.05Mn and similar solders within the ranges described herein are suitable replacements for SAC solders such as SAC105.

Further Mn doped SAC solder alloys of the type described in FIGS. 8-11 may be characterized as having Ag greater than 0 wt. % and less than or equal to about 1.5 wt. %, 0.7-2.0 wt. % of Cu, 0.001-0.2 wt. % of Mn, and the remainder of Sn.

Solder alloys having no Ag content are also encompassed in the solder alloys of the type described in FIG. 8. A particular sub-range has between about 0.3 wt. % and about 0.7 wt. % Ag, between about 0.7 wt. % and about 1.2 wt. % Cu, about 0.01 wt. % and about 0.09 wt. % Mn, and a balance of Sn.

In solder alloys without any Ag, the alloys tend to be soft with lower thermal fatigue performance. Drop test performance depends on a combination of both ductility and toughness. Softening of the alloy by forgoing Ag can result in lower toughness and, consequently, lower drop test performance. However, in some cases, the alloys without Ag, but with the disclosed ranges of Cu and Mn may have sufficient thermal fatigue and drop test performance for the desired application. If the Ag amount is greater than 1.5 wt. % the alloy becomes harder and stiffer due to the increasing $Ag_3Sn$ intermetallic particles in the bulk solder alloy. The high stiffness and hardness will hurt the drop test performance of the alloys. In some non-equilibrium conditions, a plate-like intermetallic structure may form in the bulk solder alloy proximal to the joint intermetallic layer. However, such a plate-like intermetallic structure typically forms above 2.6 wt. %. A particular sub-range for the Ag to avoid the softness of low Ag amounts and the stiffness of higher Ag amounts is between about 0.3 wt. % and about 1.5 wt. % Ag.

If the Cu amount is less than 0.7 wt. % then spalling of the intermetallic layer between the solder and the Ni substrate into the bulk solder of the joint may occur. The spalling of the intermetallics is influenced by a number of factors, such as the substrate, the reflow process parameters, and the specific solder composition. However, in alloys with greater than about 0.7 wt. % Cu, the spalling is reduced or avoided. At greater than about 2.0 wt. % Cu, an excessive amount of $Cu_6Sn_5$ intermetallic, particles form in the bulk solder material. This reduces the solder joint's compliance by increasing the hardness and stiffness of the joint. In particular, 1.5 wt. % may be a preferred upper limit in the amount of Cu to avoid the effects of excessive Cu. The Cu content between about 0.7 wt. % and 1.5 wt. % helps decrease the intermetallic layer thickness between the substrate and the bulk solder (the "IMC layer"). The drop test performance of these solder alloys increases with decreasing IMC layer thickness. A particular sub-range of Cu to avoid the effects of too much or too little Cu and to provide the beneficial decrease in the IMC layer thickness is between about 0.7 wt. % and about 1.2 wt. % Cu.

If the amount of Mn is increased above about 0.2 wt. % then the oxidation tendencies of the solder become detrimental, which can adversely affect the wettability of the solder. However, even very small amounts, such as 0.001 wt. % Mn can beneficially affect the drop test performance of the solder. A particular sub-range of Mn providing beneficial effects on drop test performance without adverse oxidation tendencies is between about 0.01 wt. % and about 0.09 wt. % Mn.

Figure 13A:
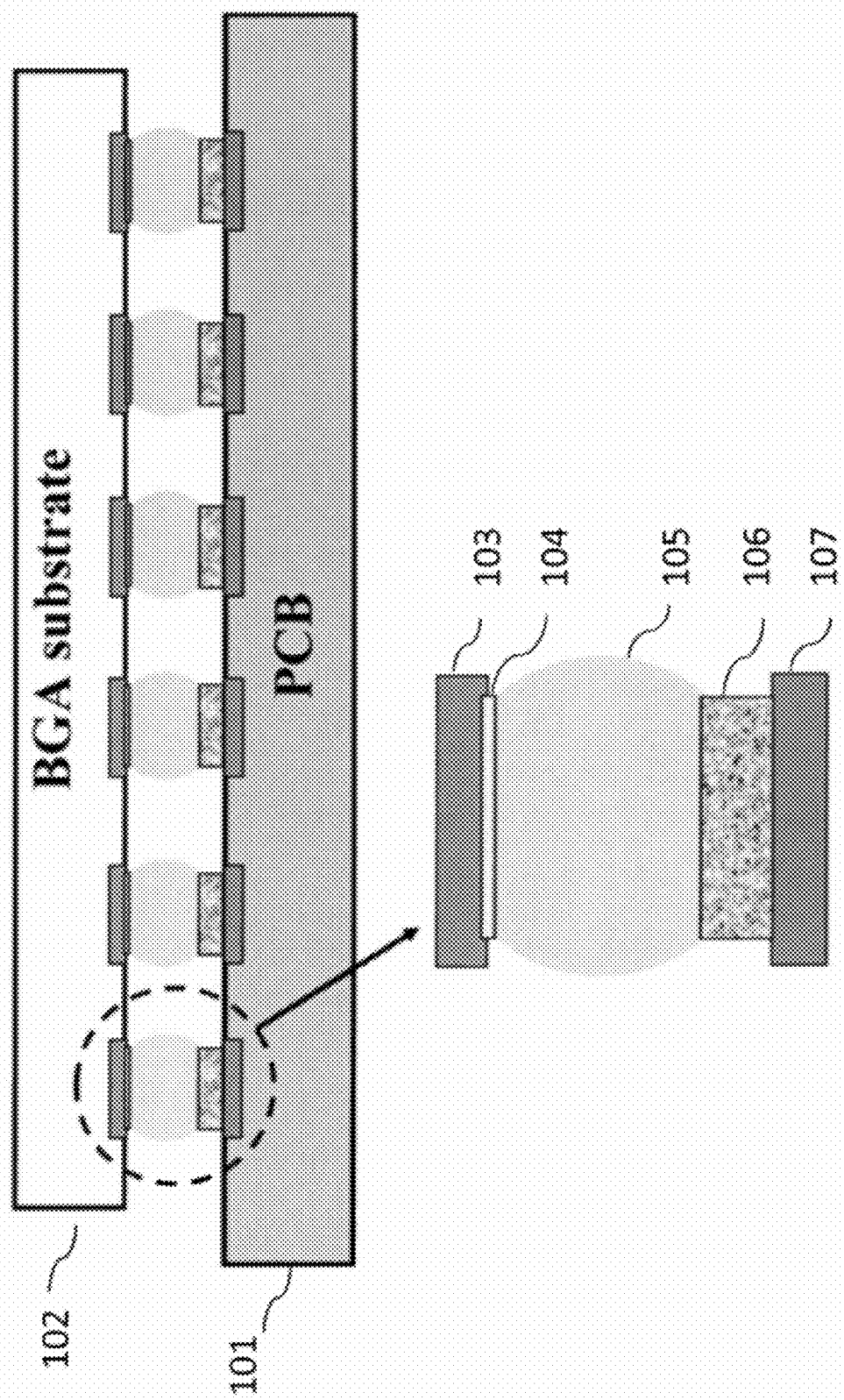
FIGS. 13A and 13B illustrate a BGA assembly before and after SMT soldering.
Figure 13B:
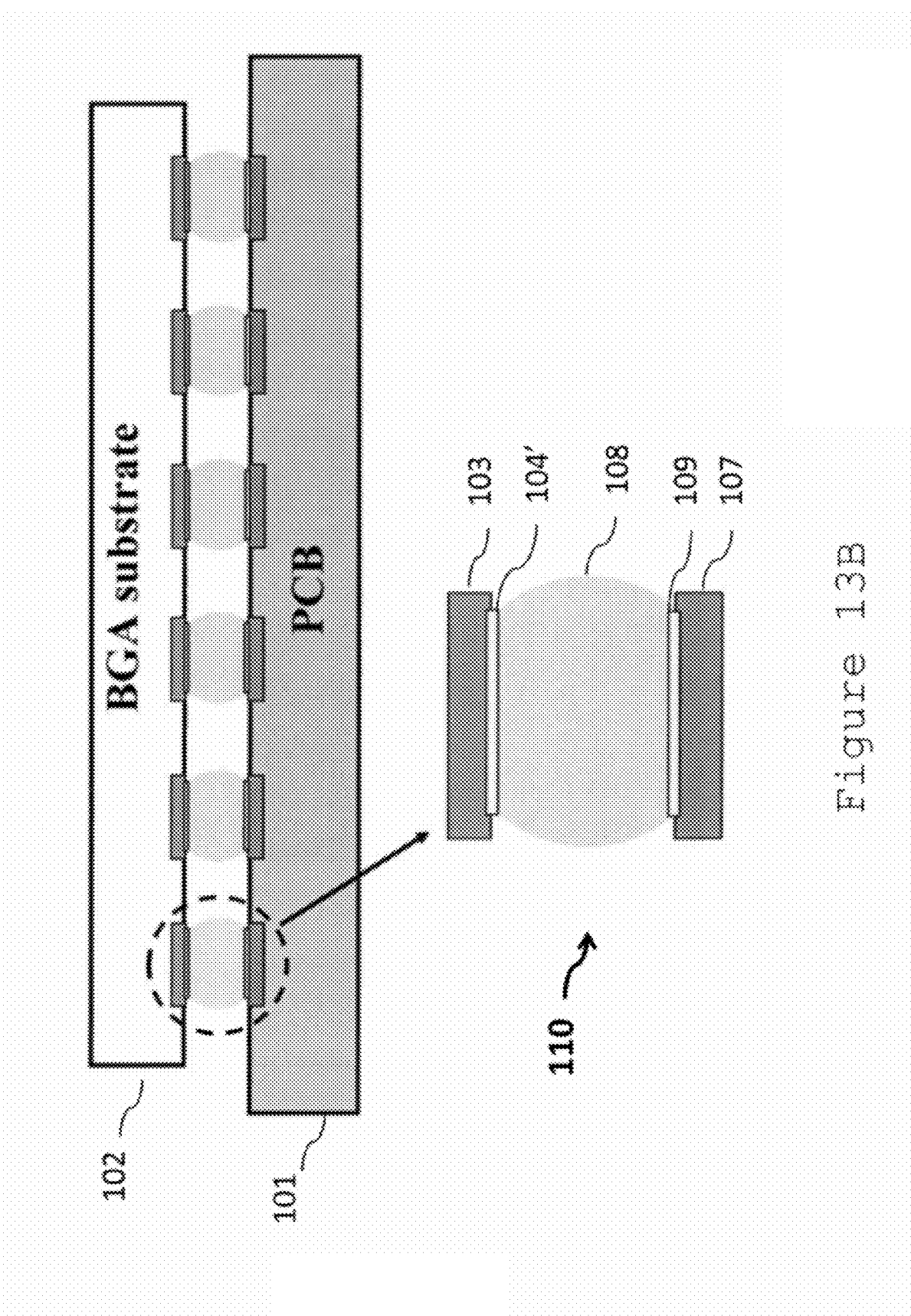

FIG. 13A illustrates an example BGA package assembled to a PCB before reflow and FIG. 13B illustrates the example BGA package bonded to a PCB after reflow. In the BGA package, the solder ball 105 has a composition in accordance with the present disclosure. The solder ball 105 is bonded to the contact pad 103, with an IMC layer 104 formed between them. In FIG. 13A, the BGA package 102 is placed on a PCB 101 with contact pads 107 pre-printed with a solder paste 106. The solder paste 106 is a mixture of a flux and a solder powder that has a composition in accordance with the present disclosure. In alternative embodiments, only one of the solder ball 105 or the solder paste 106 may have a composition in accordance with the present disclosure. In such embodiments, the other one of the solder ball 105 or solder paste 106 may be composed of any other solder composition, such as a conventional SAC solder.

Both the BGA substrate 102 and the PCB 101 may comprise any conventional contact pads 103, 107 for soldering. For example, they may comprise a Copper contact pad with or without organic solderability preservatives (OSP), an electrolytic Nickel/Gold (Ni/Au) contact pad, an ENIG contact pad, an immersion Ag contact pad, an immersion Sn contact pad, or any other contact pad. In some cases, the PCB pads 107 may be pre-printed with only a flux or with other solder paste, such as a conventional SAC solder paste.

After reflow soldering, the BGA package 102 is bonded to the PCB 101. The BGA solder joint 110 includes a bulk solder region 108, an IMC layer 104' between the component-side pad 103 and the bulk solder 108, and a second IMC layer 109 between the PCB-side pad 107 and the bulk solder 108.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The term "about" when used in conjunction with an amount refers to the standard manufacturing tolerances encompassing the amount.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Likewise, where this document refers to technologies that would be apparent or known to one of ordinary skill in the art, such technologies encompass those apparent or known to the skilled artisan now or at any time in the future.

The invention claimed is:

1. A solder, consisting of:
   between 0.3 wt. % and 0.7 wt. % Ag;
   between 0.7 wt. % and 1.5 wt. % Cu;
   between 0.001 wt. % and 0.09 wt. % Mn; and
   a remainder of Sn.

2. The solder of claim 1, further consisting of:
   less than or equal to 1.2 wt. % Cu.

3. The solder of claim 1, further consisting of:
   between 0.47 wt. % and 0.56 wt. % Ag;
   between 0.8 wt. % and 1.1 wt. % Cu;
   between 0.03 and 0.08 wt. % Mn; and
   a remainder of Sn.

4. The solder of claim 1, consisting of:
   about 0.5 wt. % Ag;
   about 1.0 wt. % Cu;
   about 0.05 wt. % Mn; and
   a remainder of Sn.

5. The solder of claim 1, consisting of:
about 0.5 wt. % Ag;
about 1.0 wt. % Cu;
between 0.03 wt. % Mn and 0.08 wt. % Mn; and
a remainder of Sn.

6. The solder of claim 1, wherein the solder is in the form of a solder ball.

7. The solder of claim 1, wherein the solder is in the form of a solder paste, and further comprising a flux.

8. The solder of claim 1, wherein the solder is in the form of a solder powder.

9. The solder of claim 1, wherein the solder is in the form of a solder joint.

10. The solder of claim 9, wherein the solder joint is disposed in a mobile device.

11. The solder of claim 1, further consisting of:
between 0.002 wt. % and 0.09 wt. % Mn.

12. The solder of claim 1, further consisting of:
between 0.003 wt. % and 0.09 wt. % Mn.

13. The solder of claim 1, further consisting of:
between 0.01 wt. % and 0.09 wt. % Mn.

14. A solder consisting of:
about 0.5 wt. % Ag;
about 1.0 wt. % Cu;
about 0.05 wt. % Mn; and
a remainder of Sn.

15. A solder consisting of:
between 0.3 wt. % and 0.7 wt. % Ag;
between 0.8 wt. % and 1.1 wt. % Cu;
between 0.03 wt. % and 0.08 wt. % Mn; and
a remainder of Sn.

* * * * *